May 12, 1953
J. HESS
2,637,875
SPRING ASSEMBLY
Filed Aug. 30, 1949
4 Sheets-Sheet 1
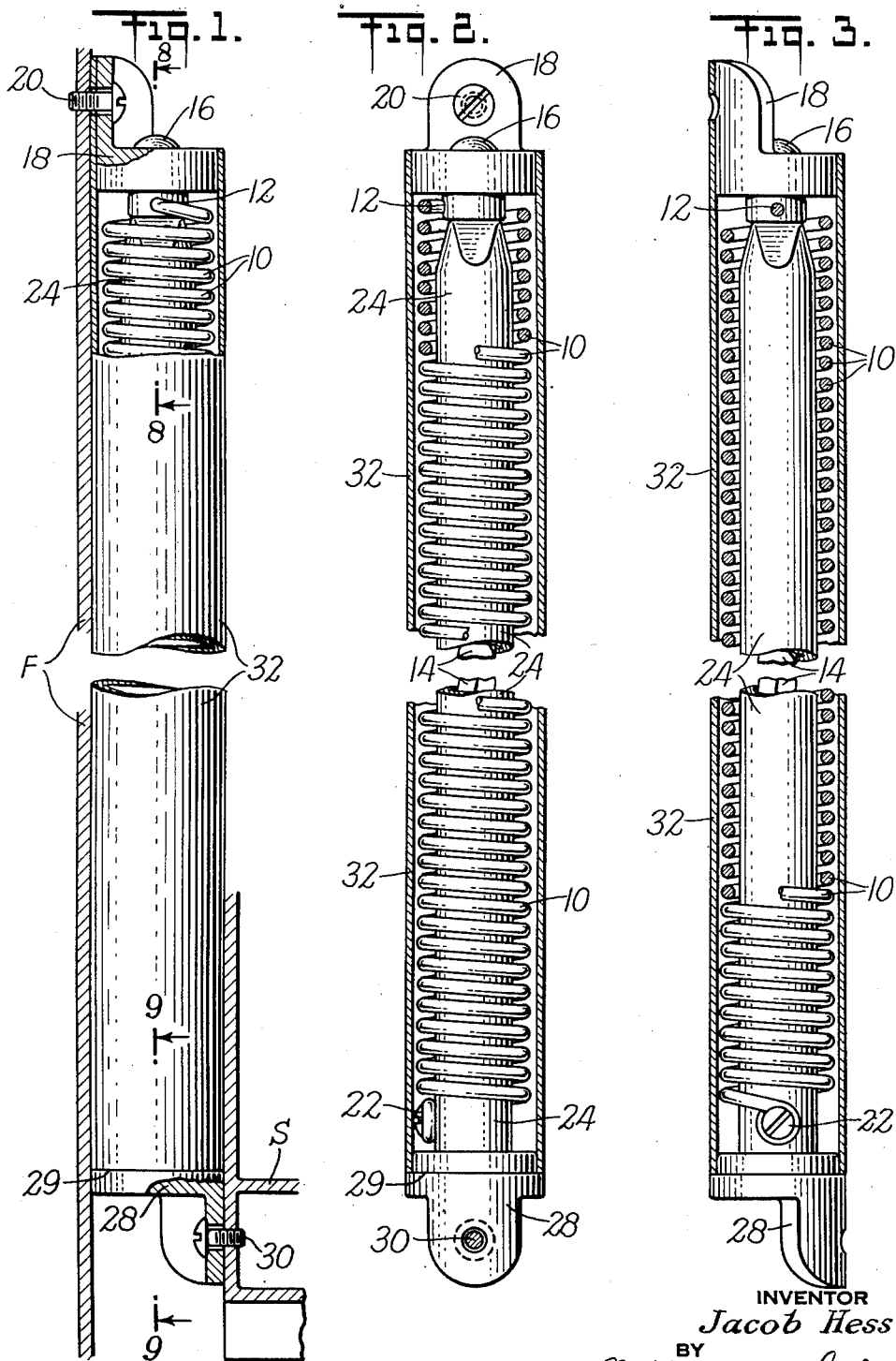
INVENTOR
Jacob Hess
BY
Curtis, Morris + Safford
ATTORNEYS May 12, 1953  J. HESS  2,637,875
SPRING ASSEMBLY
Filed Aug. 30, 1949  4 Sheets-Sheet 2
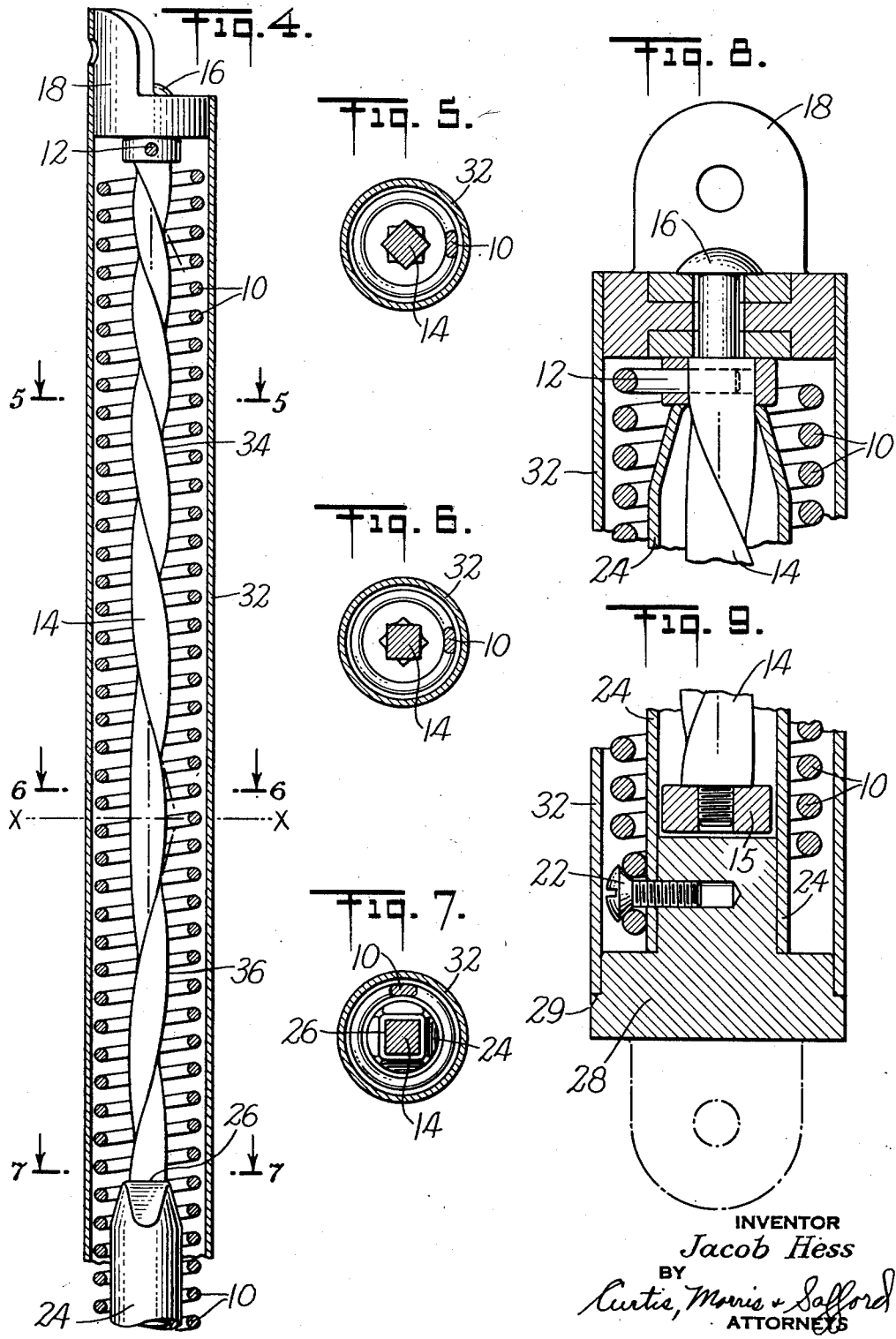

May 12, 1953          J. HESS          2,637,875
SPRING ASSEMBLY
Filed Aug. 30, 1949          4 Sheets-Sheet 3
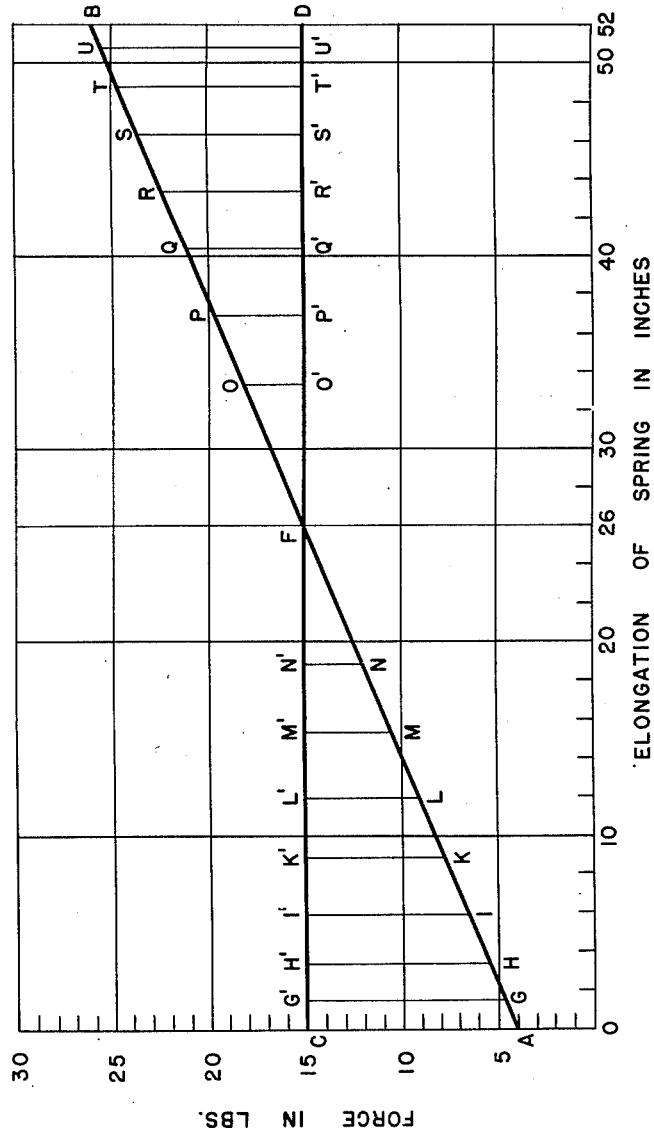
INVENTOR
*Jacob Hess*
BY
*Curtis, Morris & Safford*
ATTORNEYS May 12, 1953

J. HESS 2,637,875

SPRING ASSEMBLY

Filed Aug. 30, 1949

INVENTOR
*Jacob Hess*
BY
Curtis, Morris + Safford
ATTORNEYS

Patented May 12, 1953

2,637,875

UNITED STATES PATENT OFFICE 2,637,875

SPRING ASSEMBLY

Jacob Hess, Forest Hills, N. Y., assignor to General Bronze Corporation, Garden City, N. Y.

Application August 30, 1949, Serial No. 113,216

5 Claims. (Cl. 16—197)

This invention relates to a spring assembly. The present application is a continuation-in-part of my pending application, Serial No. 30,810, filed June 3, 1948.

An object of the invention resides in the provision of a spring assembly that is so constructed that it will support or balance the weight of a given object in various positions of adjustment.

It is an object of the invention to provide such a spring assembly, which for convenience of expression I shall hereafter term a spring balance, which employs forces built up in a coil spring by its lineal extension and its axial winding to support a weight in given and various positions of adjustment.

A further object of the invention resides in so constructing such a spring balance that the tension created by the lineal extension of the spring and the torsion created by the helical winding of the spring will so supplement each other, and will be so controlled that when the spring assembly is attached to two relatively movable objects the objects may be relatively moved toward or away from each other and will be maintained in their relative positions of adjustment.

A further object of the invention is to provide a spring assembly which includes means for attaching the assembly to two spaced relatively movable objects which tend to resist movement toward each other with a given force and which includes a combined tension and torsion spring connected with said relatively movable objects through said attaching means in such manner that the spring tension varies with relative movement of the objects, together with means to so vary the torsional effect of said spring that the torsional effect is maintained substantially equal to the difference between the given force and the tensional force of the spring in various stages of elongation of the spring.

A still further object of the invention is to provide a spring assembly which includes means for attaching the assembly to two spaced relatively movable objects which tend to resist movement toward each other with a given force and which includes a combined tension and torsion spring connected with said relatively movable objects through said attaching means, together with means to vary the torsional effect of said spring as the tension of said spring increases, the torsional effect being varied in an amount equal to the difference between said given force and the tensional force in various stages of elongations of said spring, in which assembly the attaching means includes means for translating the torsional force developed during the elongation of the spring into a force which acts substantially along the lines of action of the given force and of the tensional force of the spring.

Other objects of the invention will appear as the description of the illustrated embodiment progresses.

Inasmuch as the spring balance is admirably adapted for use as a balancer for vertically slidable window sashes, I will describe the embodiment of the invention, which I have chosen for illustrative purposes in accordance with the requirements of the statute, as employed as a window balancer, but it is of course to be understood that in so describing it I am not in any way limiting my invention to this use because the invention lies, not in the specific use of any embodiment thereof, but in devices which employ the broad principle which later be described and which has above been referred to in the statement of objects.

In the drawings:

Figure 1 is a front elevation of a spring balancer incorporating one embodiment of my invention, partially broken away to expose a portion of the spring, which is shown unextended;

Figure 2 is a right side elevation of the balancer of Figure 1, further broken away to show the relative locations of the spring, guide tube and spiral actuator;

Figure 3 is an elevation similar to Figure 1 but more completely broken away to show the positions of the parts.

Figure 4 is an elevation similar to Figures 1 and 3 but broken away to show the contour of the spiral actuator and also showing the spring in extended position;

Figure 11:
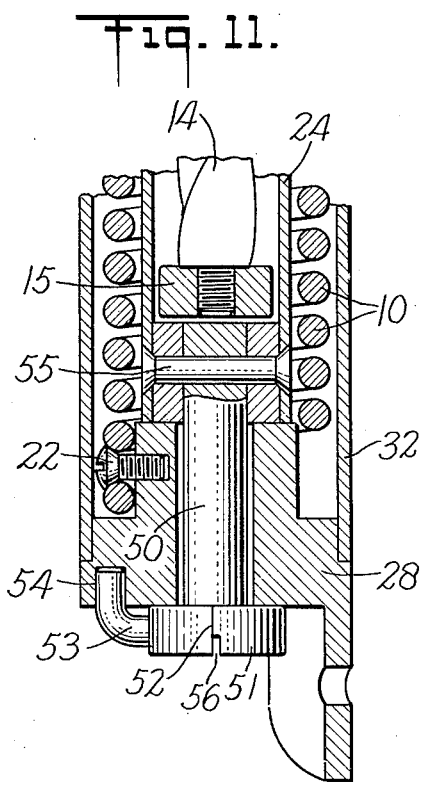
Figure 12:
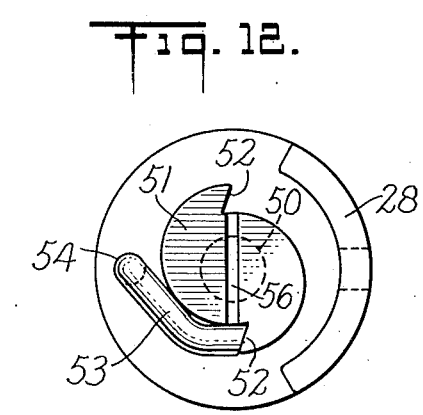

Figures 5, 6 and 7 are horizontal sections taken on the lines 5—5, 6—6 and 7—7 respectively of Figure 4 and showing the relationship between the guide tube and spiral actuator;

Figure 8 is an enlarged fragmentary vertical section showing the upper mounting of the spiral actuator;

Figure 9 is a similar section showing the lower mounting of the actuator;

Figure 10 is a graph showing the relation of the tensional and torsional forces developed in the device;

Figure 11 is a vertical section of the lower part of a modified form of the device which includes means for adjusting the torsion of the spring after or during the installation thereof;

Figure 12 is a bottom plan view of the structure of Figure 11; and

Figure 13:
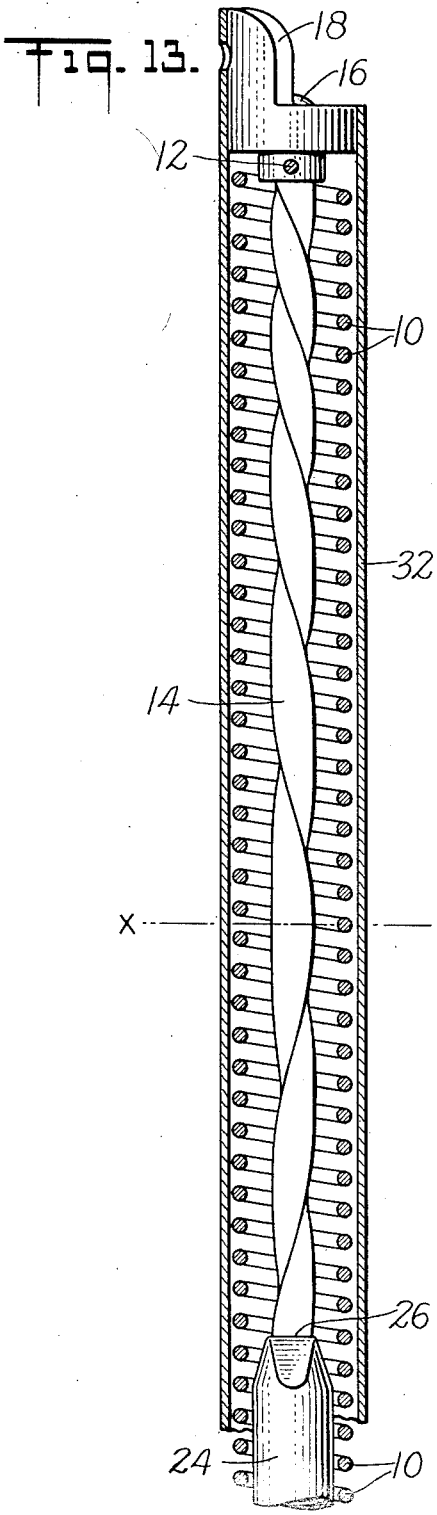

Figure 13 is a view similar to Figure 4 of another embodiment of the invention wherein the relationship between the parts is such that torsion is produced in the spring by unwinding the spring.

Referring to the drawings and more particularly to Figures 1-4 thereof, the reference character F indicates a window frame having a vertically slidable sash which in Figure 1 is indicated by the reference character S. A helical spring 10 which is of substantially uniform characteristics in all respects throughout its length and which is pretensioned and pretorsioned in a manner which later will be explained, is secured at its upper end, as at 12, to a spiral actuator rod 14 which rod is axially aligned within the spring and is mounted at 16 for rotation in a bracket 18 secured to the window frame F by a screw 20.

The opposite end of the spring 10 is attached by the screw 22 to a guide tube 24, which in the form illustrated is a tube having a guide-way 26 (see Figures 4 and 7) at its upper end for reception of the spiral actuator 14. As the guide tube 24 moves up and down, the relative axial movement of the guide and actuator 14 cause the actuator to rotate and thereby rotate the upper end of spring 10.

Referring to Figure 9, the screw 22 connects the guide tube 24 as well as spring 10 to a bracket 28, which is adapted to be secured (Figure 1) to the sash S by the screw 30. It is apparent that when the device is used in connection with two relatively movable objects other than a window sash and frame, the brackets 18 and 28 respectively would be secured to the two relatively movable objects.

Reverting to Figure 9, the actuator 14 is threaded at its lower end to receive a nut 15 which is slidable within the guide 24 and serves to position the actuator 14 centrally of the guide. If desired, an outer casing 32 may be provided for housing the spring 10 and its associated parts. As indicated in Figures 8 and 9, the casing 32 is secured to the bracket 18 and extends between the brackets. The lower bracket 28 is provided with a shoulder 29 which is engaged by the lower portion of casing 32 when the brackets are in their most closely spaced position, and this serves to limit movement of the brackets toward each other. Referring particularly to Figures 4-7, the actuator 14, when in the form illustrated in the drawing, is produced by twisting a rod that is of rectangular cross-section. The actuator comprises two spiral sections twisted in opposite directions and meeting at a point indicated by the line X—X of Figure 4. The twisting of the actuator rod is so effected that the pitch of the resulting spiral is a minimum at the two ends of the actuator and becomes infinitely large at the line X—X. The helical edge of the upper spiral in Figure 4 is designated 34 and the helical edges of the lower spiral are designated 36.

The guide-way 26 is of a configuration complemental to the cross-section of the actuator rod 14 so that when the two ends of the balancer rod are moved relatively toward or away from each other, the actuator rod 14 and guide tube 24 are relatively rotated. In the embodiment shown in the drawing, the guide tube 24 is effectively fixed to the sash and the actuator rod 14 rotates to rotate the upper end of spring 10. It is, of course, to be understood that the particular cross-sectional configuration of the rod is not critical except that it should be of such a configuration that its relative movement longitudinally with respect to the guide 24 causes it to rotate in the manner and to the extent hereinafter described. For example, the actuator rod may be a twisted strip rather than a twisted rod. Also relative rotation of actuator 14 and tube 24 may be achieved by holding the actuator stationary and rotating the tube.

As pointed out above, the pitches of the spiral sections of the actuator rod 14 are a minimum at its ends and increase gradually to a maximum at what may be termed the neutral point of the actuator at line X—X. As guide 24 is initially moved by downward movement of the sash from the position shown in Figure 1, the rotation of the actuator and upper end of spring 10 will be relatively rapid because of the fact that the actuator pitch is a minimum. With continuing downward movement of the guide tube the rotative movement of the actuator rod 14 becomes slower and when the guide-way or key-way 26 reaches the neutral point X—X, rotation of the actuator ceases. Further downward movement of the key-way 26 and guide 24 causes the actuator to rotate in the opposite direction, first slowly and then more rapidly as the guide 24 reaches its lowermost position.

In constructing the device shown in the drawing, a spring of substantially uniform characteristics throughout its length and which has an initial tension is provided. After one end of the spring at 12, for instance, is attached to the actuator rod, the spring is wound up to a desired degree to give it an initial torsion. Thus, the spring will have both a pretension and a pretorsion and it will, as a result, have a tendency to contract longitudinally and to unwind axially. After the spring has been given the proper torsion, it is secured at 22 as heretofore described.

The operation of the above-described device is as follows: Assuming the parts of the device to be in the position illustrated in Figure 1 of the drawing with the spring 10 under a pretension and a pretorsion, as the two brackets 18 and 28 are moved apart two things will happen simultaneously. The tensional force of the spring will increase and this increase will continue so long as the brackets are moved apart, or in other words, so long as the spring is stretched longitudinally. Thus, as the spring is stretched, it exerts a greater and greater force tending to move the brackets toward each other. As the spring is extended, due to movement of the brackets 18 and 28 apart, the spring also will be wound axially because of the rotation of the actuator rod 14 caused by the coaction between the rod and the guide tube 24 and guide-way 26.

When the parts are in the position indicated in Figure 1, the pretorsioning force of the spring acts through actuator rod 14 and guide-way 26 to produce an upwardly acting force component, hereafter referred to as effective torsional force. As the guide-way 26 is moved downwardly from its initial position to the neutral point of the actuator rod, the rod is rotated in a direction to cause the spring to be wound up and its torsion thereby increased. However, the pitch of the spiral of the actuator rod between the initial position and the center of the rod changes at such a rate that the effective torsional force decreases as the guide-way 24 moves downwardly, in spite of the fact that the torsion of the spring increases during this same period. When the guide-way 26 reaches the neutral point X—X of the actuator rod, the rod stops rotating and the effective torsional force becomes zero. The tensional characteristic of the spring 10 is so selected that at this neutral point, the tension of the spring is just equal to the weight being supported by the spring assembly.

Upon further downward movement of the guide-way 26, actuator rod 14 is rotated in the opposite direction to unwind spring 11 and decrease the torsion of the spring. As the guide-way 26 moves from the neutral point of the actuator rod to its lower end, the spring torsion acts through the rod 14 to produce a downwardly acting effective torsional force that increases as the spring is further extended. The pitch of the lower spiral 36 of the actuator rod is such that this downward effective torsional force increases in proportion to the increase in spring tension and thus the net force exerted on the bracket 28 remains constant. In other words, the effective torsional force acts in the same direction as the tensional force when the guide-way 26 engages the upper spiral of rod 14, and in the opposite direction to the tensional force when the guide-way 26 engages the lower spiral of rod 14, and the pitch of the spiral is so selected as to cause the effective torsional force to be proportioned to the tensional force in such manner that the net force acting on bracket 28 remains substantially constant. It may be noted that in an algebraic sense the effective torsional force may be considered as decreasing continuously as the guide-way 26 moves from its topmost to its lowermost positions and therefore the effective torsional force may be said to vary inversely with the torsional force throughout the range of movement of the device.

To further illustrate the operation, assume that the bracket 28 is fixed to a slidable window sash having a weight of 15 pounds. Assume further that with the parts in the position shown in Figure 1, the pretension of the spring is 4 pounds. Under such circumstances, the spring is given a pretorsion such that it will react through the actuator rod to produce an upwardly acting effective torsional force of 11 pounds. Thus the sum of the tensional force and the effective torsional force will be equal to the weight of the sash and the sash will remain stationary.

When the sash is moved downwardly, the spring is stretched and its tension increases gradually and uniformly to the point where the guide-way 26 reaches the neutral point X—X. During this downward movement of the sash, the effective torsional force decreases proportionally as previously described and becomes zero at the neutral point. The tensional characteristic of the spring is so chosen that the tensional force becomes 15 pounds, i. e., the weight of the window sash, when the guide-way 26 engages the neutral point X—X. Thus at this point the sash is completely supported by the tensional force of the spring.

As the downward movement of the sash continues, the tensional force of the spring continues to increase. At the same time, the effective torsional force, acting in a downward direction, increases proportionately and thus resists contraction of the spring with a force equal to that by which the tensional force exceeds 15 pounds. Since the net force exerted by the spring balance is always the same the sash will be supported in all its positions of vertical adjustment by a force substantially equal to the weight of the sash.

Entirely by way of example and not by way of limitation in any sense, I give below an example of the embodiment of my invention which I have successfully used to carry out the functions and obtain the results disclosed in this application.

An embodiment which is now described by way of example is structurally substantially the same as that disclosed in the drawing. A helical steel spring was used with an outside diameter of .720 inch, the diameter of the wire of the spring being .080 inch. The overall length of the spring unstretched was 52 inches and the initial tension of the spring unstretched was 4 pounds. The tension of the spring when stretched to 108 inches was 26 pounds. Referring to the drawings herein for convenience, the distance between the point 12 and the line X—X was 26 inches and the distance between the line X—X and the point 22 was 26 inches. Each spiral of the actuator rod 14 had 7½ complete turns; i. e., each edge of the rod completes 2700° around the axis of the rod between the neutral point X—X and its respective end of the rod.

Figure 10 is a graph illustrating this spring arrangement and showing the relationship between the tensional and torsional forces. On this graph, the ordinates are force in pounds and the abscissae are elongations of the spring in inches. The line AFB indicates the approximate tensional force of the spring in pounds when stretched to various lengths up to 104 inches, the spring being under the initial tension of 4 pounds when unstretched as indicated at point A and having 26 pounds of tensional force when elongated 52 inches as indicated at B. The vertical distances between the lines AF and CF indicates the effective torsional force as the guide-way 26 moves from its upper position of Figure 1 toward the neutral point of the actuator rod. As previously pointed out, this effective torsional force acts to augment the tensional force of the spring.

The vertical distances between the lines FB and FD indicate the effective torsional force as the guide-way 26 moves from the neutral point to the lower end of the actuator rod. During this period, the effective torsional force acts in a direction opposite to the tensional force of the spring. The line CFD represents the resultant force acting on the sash when friction existing in the balance is not taken into consideration. Since friction will resist movement in either direction, equating the net force applied by the spring and the weight of the sash will cause the sash to be balanced in any position of its vertical range of movement.

It may be noted that the point F, which is shown as midway between the points A and B, is so located because the particular spring arrangement represented by this graph was so constructed, but it is to be understood that this point F may be shifted toward or to the points A or B. Such a shift will be reflected in a corresponding change in the form of the actuator rod 14. More specifically, if point F is shifted toward A or B, the direction of the spiral will reverse at the point on the actuator corresponding to the new position of point F. In the terms of the structure shown in the drawing, the neutral point X—X may be above or below the point at which it is shown in the drawing. However, preferred results are obtained by having the neutral point at or near the center of the actuator rod.

When the number of twists of the rod 14, i. e., the number of times an edge of the spiral passes around the axis of the rod 14 above the line X—X has been selected, the area ACF is divided into a number of equal sub-areas corresponding to the selected number of turns of the spiral and the distances CG', G'H', H'I', I'K', etc. correspond with the length of the edges of the rod as they pass 360° around the axis of the rod. Likewise, the corresponding length of the edges of the rod 14 below the line X—X are similarly determined. It is to be noted in the graph illustrated in the drawing that the areas NN'F and FOO' are each one-half the other described areas and this is because the particular graph illustrates 7½ turns of the rod.

The formula for determining the distances between the points G' and F, H' and F, I' and F, etc. is $$G'F = \frac{L}{\left(\frac{N}{M-1}\right)^{\frac{1}{2}}} \quad H'F = \frac{L}{\left(\frac{N}{N-2}\right)^{\frac{1}{2}}}$$

$$I'F = \frac{L}{\left(\frac{N}{N-3}\right)^{\frac{1}{2}}} \quad K'F = \frac{L}{\left(\frac{N}{N-4}\right)^{\frac{1}{2}}}$$

In the above formulae "L" is the length of the line between the point "C" and the point "F" and "N" is the number of twists in rod 14. In the present case $L = 26$ and $N = 7½$.

While the above formula is substantially correct, it nevertheless leaves out of consideration the variation in spring torsion as distinguished from the effective torsional force of the spring and also does not take into account variations in spring friction as the spring is extended.

The foregoing equations may be modified to take these two factors into account by reducing the exponent in the denominator of each equation to a value somewhat less than one-half, but greater than one-third.

Referring to the modification shown in Figures 11 and 12, the guide tube 24 is secured by a rivet 55 to a pin 50 which is rotatably mounted in the bracket 28 and has a head 51 at its lower end in which are found the peripheral notches 52. A pawl 53 is mounted at 54 in the bracket 28 and is resiliently brassed toward the periphery of head 51 in such manner as to normally engage one of the notches 52 and thereby prevent rotation of pin 50. The head 51 is provided with a kerf 56 by means of which the head and pin 50 may be rotated with a screw driver. Since pin 50 is connected to tube 24 which is in turn connected through rod 14 to the upper end of the spring, the spring torsional may be adjusted by rotation of the pin 50. Thus the structure just described makes it possible to adjust the torsion of the spring to adapt it to particular installations where the weight of the object, such as the window sash, necessitates such an adjustment.

Referring to Figure 13 of the drawing, the structure shown in this figure is similar to that shown in Figure 4 except that the spring is wound in the opposite direction. In the embodiment of Figure 13, the spring is pretorsioned by unwinding it and the initial downward movement of the guide-way 26 causes the spring to unwind further. The unwinding of the spring ceases when the guide-way 26 reaches the neutral point X—X of the actuator rod and thereafter the spring is wound up by further downward movement of the guide-way. In other respects, the operation of the embodiment of Figure 13 is the same as that previously described.

While I have illustrated and described a particular embodiment and a particular example of the application of my invention, it is to be understood that many variations in structural features and embodiments may be made without departing from the spirit of the invention and without exceeding the scope of the claims and I therefore do not wish to be limited to that particular embodiment or example except insofar as limitation is made necessary by the claims themselves.

What is claimed is:

1. A spring assembly adapted to be used to balance the weight of a window sash vertically movable in a window frame comprising in combination, a pair of spaced brackets adapted to be connected to said frame and sash respectively, a spiral actuator rotatably supported on one of said brackets and a cooperating key-way through which said actuator extends, said key-way being formed in one end of a tube, the other end of which is secured to the other of said brackets, a coil spring surrounding said actuator and tube, one end of said spring being connected to said actuator near its point of support and the other end of said spring being effectively connected to said other bracket, said actuator comprising two oppositely wound spiral sections extending in opposite directions from a point near the center thereof, the spiral section adjacent to the point of support of said actuator being wound in the same sense as the spiral of said coil spring, and the spiral section remote from the point of support of said actuator being wound in opposite sense with respect to the spiral of said spring, each of said spiral sections having a pitch that decreases progressively from the center of said actuator substantially to the ends thereof, and manually adjustable means operatively associated with said other bracket for varying the torsion of said spring.

2. A spring assembly adapted to be used to balance the weight of a window sash vertically movable in a window frame comprising in combination, a pair of spaced brackets adapted to be connected to said frame and sash respectively, a spiral actuator rotatably supported from one of said brackets and a cooperating key-way through which said actuator extends, said key-way being formed in one end of a tube, the other end of which is effectively connected to the other of said brackets and secured in fixed relation to said other bracket, a coil spring surrounding said actuator and tube, said spring being connected at one end to said spiral actuator near its point of support and effectively connected at its other end to said other bracket, said actuator having two oppositely wound spiral sections extending in opposite directions from a point near the center thereof, the spiral section nearest the point of support of said actuator being wound in the same sense as the spiral of said coil spring and the spiral section more remote from the point of support of said actuator being wound in opposite sense with respect to the spiral of said spring.

3. A spring assembly adapted to be used to balance the weight of a window sash vertically movable in a window frame comprising in combination, a pair of spaced brackets adapted to be connected to said frame and sash respectively, a spiral actuator rotatably supported from one of said brackets and a cooperating key-way through which said actuator extends, said key-way being formed in one end of a tube, the other end of which is effectively connected to the other of said brackets and secured in fixed relation to said other bracket, a coil spring wound in the same sense throughout its length and surrounding said actuator and tube, said spring being connected at one end to said spiral actuator near its point of support and effectively connected at its other end to said other bracket, said actuator having two oppositely wound spiral sections extending in opposite directions from a point near the center thereof.

4. A spring assembly adapted to be used to balance the weight of a window sash vertically movable in a window frame, comprising in combination, a pair of spaced brackets adapted to be connected to said frame and sash respectively, a coil spring wound in the same sense throughout its length and effectively connected at its ends to said brackets, a pair of spring-operating members, one of which is a spiral actuator effectively connected to one of said brackets and the other of which is a cooperating key-way through which said actuator extends, said key-way being effectively connected to the other of said brackets, one of said operating members being rotatably secured to its associated bracket, and one end of said spring being secured to said rotatable member near said associated bracket, said actuator having two oppositely wound spiral sections extending in opposite directions from a point near the center thereof.

5. A spring assembly adapted to be used to balance the weight of a window sash vertically movable in a window frame, comprising in combination, a pair of spaced attaching means adapted to be connected to said frame and sash respectively, a coil spring wound in the same sense throughout its length and effectively connected at its ends to said attaching means, a pair of spring-operating members, one of which is a spiral actuator effectively connected to one of said attaching means and the other of which is a cooperating key-way through which said actuator extends, said key-way being effectively connected to the other of said attaching means, one of said operating members being rotatably secured to its associated attaching means, and one end of said spring being secured to said rotatable member near said associated attaching means, said actuator having two oppositely wound spiral sections extending in opposite directions from a point near the center thereof.

JACOB HESS.

References Cited in the file of this patent

UNITED STATES PATENTS

| Number | Name | Date |
|---|---|---|
| 2,041,646 | Larson | May 19, 1936 |
| 2,565,804 | DeVries et al. | Aug. 28, 1951 |
| 2,577,953 | DeVries et al. | Dec. 11, 1951 |